June 9, 1936.  J. M. COLBY  2,043,234
TRACK FOR THE WHEELS OF VEHICLES
Filed Nov. 15, 1934
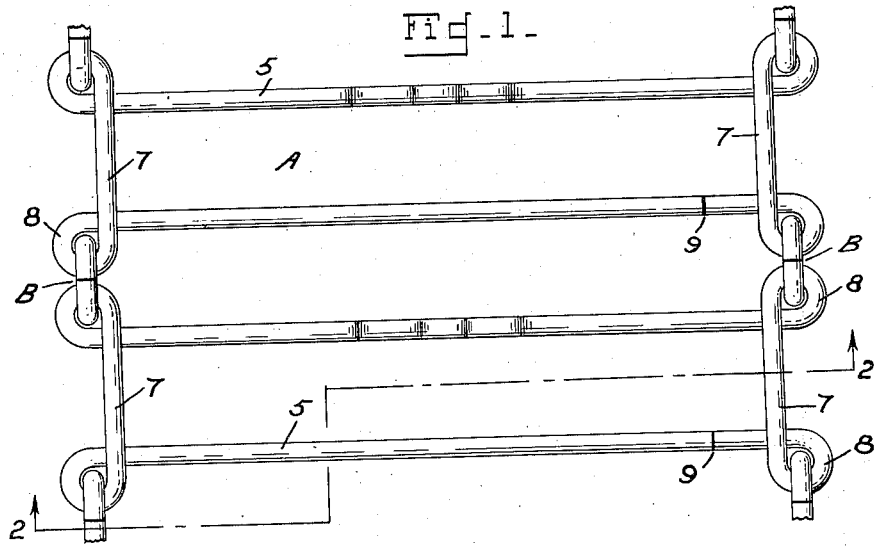
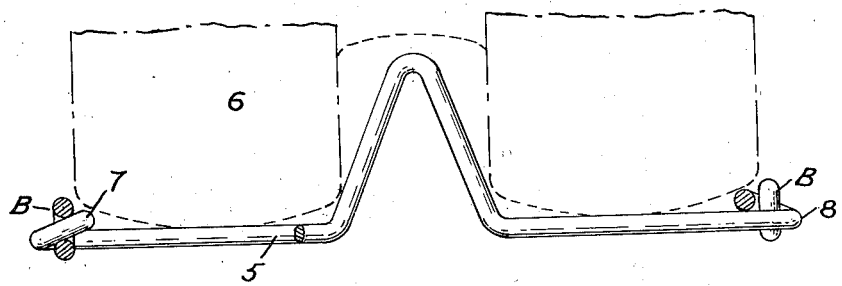
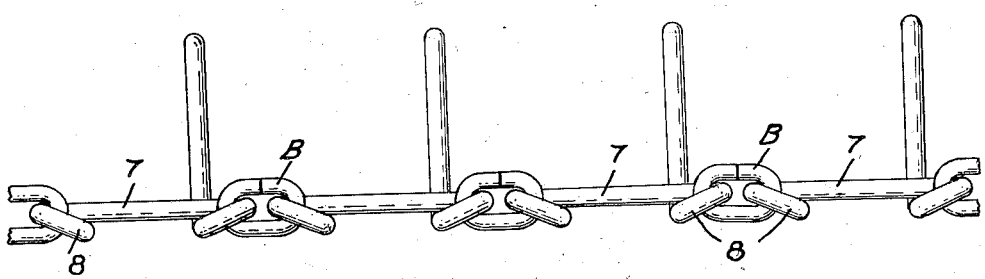
Inventor
Joseph M. Colby
By W. N. Roach
Attorney Patented June 9, 1936

2,043,234

UNITED STATES PATENT OFFICE 2,043,234

TRACK FOR THE WHEELS OF VEHICLES

Joseph M. Colby, United States Army,
Watertown, Mass.

Application November 15, 1934, Serial No. 753,164

2 Claims. (Cl. 305—10)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to a Track for the wheels of a vehicle.

The purpose of the invention is to provide a simple, inexpensive track which will be of light weight and will insure positive drive between the wheels and track without creeping or slipping.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is an inside plan view of a portion of an endless track constructed in accordance with the invention.

Fig. 2 is a sectional view on the line 2—2 of Fig. 1.

Fig. 3 is a view in side elevation of Fig. 1.

Referring to the drawing by characters of reference there is shown a portion of a chain adapted to serve as an endless track for the wheel or wheels of a vehicle. The track consists of a series of grousers or shoes A connected by means of links B.

The shoes are all identical and each one consists of a rectangular frame formed of a single length of rod which is shaped to provide a pair of parallel crossbars 5—5 adapted to be positioned transversely of the wheel 6 of a vehicle and joined at their ends by side bars 7—7. The rod is formed into loops 8 at the four corners of the frame and the side bars preferably cross the crossbars on the inner side of the track so that they are in a position to engage the tires of the wheel and thereby tend to prevent lateral displacement of the track with respect to the wheel.

The shoe just described is preferably formed of a single length of rod and the two ends are joined by welding as at 9.

Adjacent shoes are connected by a pair of the links B, each link passing through correspondingly adjacent loops 8 of the shoes. The loops and the links are preferably so dimensioned that the spacing between adjacent crossbars of adjacent shoes is equal to the spacing between the crossbars of each shoe.

In operation the resilient tires of the wheels contact the ground between the crossbars and the weight of the vehicle causes the crossbars to be pressed into and grip the tire. The track being of open construction will not become clogged with earth or snow.

I claim:

1. In a wheel track, a plurality of similar sections, each section comprising a frame formed of a single length of rod and bent to provide spaced crossbars and side bars with loops at the corners of the frame, links, each link connecting loops of adjacent sections, said adjacent loops and links dimensioned to space the crossbars of adjacent sections an amount equal to the spacing of the crossbars of a section.

2. In a wheel track, a plurality of similar sections, each section comprising a rectangular frame formed of rod material and bent to provide a pair of parallel spaced cross-bars and side-bars with loops at the four corners of the frame, and links, each link connecting the adjacent loops of adjacent sections.

JOSEPH M. COLBY.